United States Patent Office 3,325,228
Patented June 13, 1967

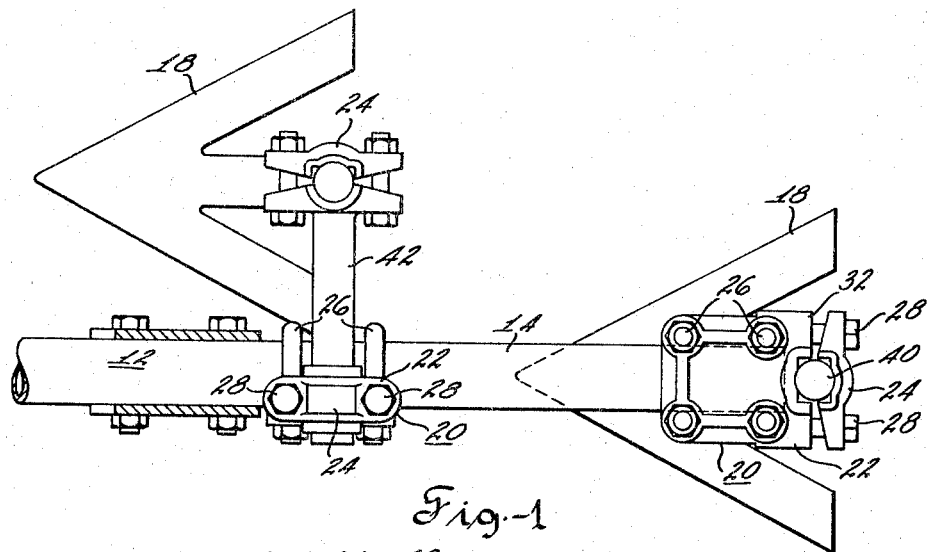
Fig. 1
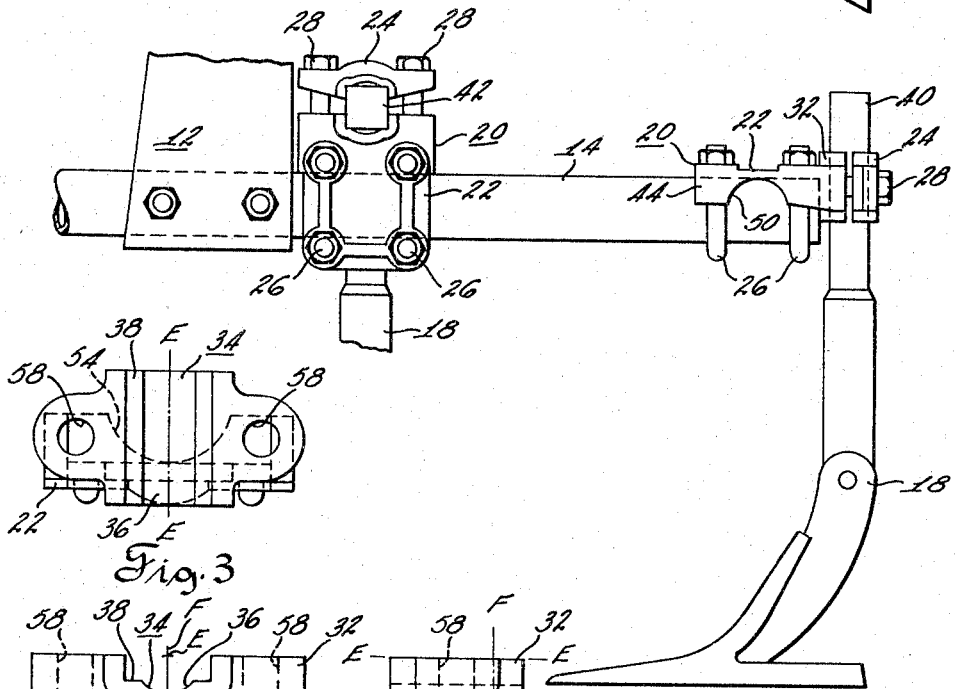
Fig. 3
Fig. 2
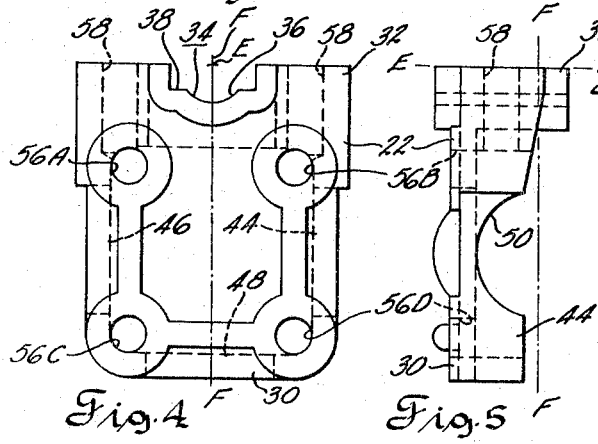
Fig. 4
Fig. 5
Inventor
Llewellyn R. Lien
By Kenneth C...
Attorney

3,325,228
HORIZONTAL ORIENTABLE PLOW STANDARD CLAMP
Llewellyn R. Lien, Muskego, Wis., assignor to Allis-Chalmers Manufacturing Company, Milwaukee, Wis.
Filed June 13, 1966, Ser. No. 556,991
4 Claims. (Cl. 306—1.5)

This invention relates generally to agricultural implements and is more particularly directed toward means for adjustably attaching individual tools to the carrier bar or any suitable part of an agricultural machine.

This invention is of particular utility, but not limited in its application, to the attachment of ground working tools to cultivator frames. Furthermore, the present invention contemplates an attaching means for tools which may be used with a supporting frame structure which is relatively inexpensive to construct.

During recent years many innovations have been introduced relative to row crop cultivation and various tool clamps for implement gang bars have been proposed in the past, but these for the most part have been designed to perform a specific function and have not been universally adaptable to change for various usages. Modern row crop cultivation requires a variety of earth working tools positioned in numerous ways to suit a particular type of plant or soil condition.

Another object of this invention is to provide a universal clamp adapted for use in securing tool shanks to the horizontal supporting gang bar of a cultivator.

A further object of this invention is to provide a clamp capable of being adjusted so that the clamp may be arranged in a horizontal position to support a tool on either side or in longitudinal alignment with a cultivator gang bar, and additionally the clamp may be arranged in a vertical position at either side of a horizontal support to accommodate crossheads for laterally offsetting of tools.

Accordingly, the present invention may be considered as comprising the various constructions and combination hereinafter more particularly pointed out in the descriptive matter and claims, reference being had to the accompanying drawings in which:

FIG. 1 is a plan view of a tool arrangement embodying the subject invention;

FIG. 2 is a side elevation of the tool arrangement shown in FIG. 1;

FIG. 3 is an end view of one of the clamps shown in the other figures and drawn to an enlarged scale;

FIG. 4 is a plan view of the clamp shown in FIG. 3; and,

FIG. 5 is a side view of the clamp shown in FIG. 3.

Referring to FIGS. 1 and 2, a cultivator gang 12 of conventional design is shown having longitudinally arranged gang bars 14 (only one of which is shown). The gang bars are adapted to be raised and lowered by hydraulic lift mechanism (not shown) in a conventional manner. Gang bars 14 are straight and of round tubular cross section so as to provide a rigid mounting for one or more cultivator tools 18.

Clamp assembly 20 includes a clamp block 22, cap 24, U-bolts 26 and clamping screws 28. Clamp block 22 is of generally rectangular configuration and includes a wall portion 30 (FIG. 5) and a tool mounting portion 32 located at one end and at right angles to said wall portion. The tool mounting portion 32 of the clamp block 22 is provided with a recess or groove 34 (see FIG. 4) which is formed with an arcuate portion 36 and a shouldered portion 38 so as to accommodate a round member such as a tool shank 40 (see FIG. 2) or a rectangular member such as a square crosshead 42. To one side of the wall portion 30, the clamp block 22 (see FIG. 4) has ribs 44, 46 and 48. The ribs 44 and 46 have arcuately recessed edge portions 50 (see FIG. 5) for clamping the block along the length of the cylinder gang tube 14 (see FIG. 2). The end rib 48 and the inner face of the tool mounting portion 32 have corresponding arcuate recessed edge portions 54 (see FIG. 3) for clamping to either end of gang tube 14. Four equally spaced openings 56A, 56B, 56C and 56D (see FIG. 4) are formed in the wall portion 30 of the block 22 for the reception of U-bolts 26. The legs of U-bolts 26 can either be inserted in openings 56A and 56B, 56C and 56D, or in 56A and 56C, 56B and 56D, depending how it is desired to have the clamp block 22 mounted on the tool bar. The clamp block 22 is rigidly secured in the desired location on the gang tube 14 by means of nuts on the U-bolts 26 (see FIG. 1). The tool shank 40 or crosshead 42 are adjustably secured to the tooling portion of clamp block 22 by means of a cap 24 and cap screws 28 which are received in threaded openings 58 (see FIG. 4) in the block casting 22.

It is to be noted that the central axis E—E of tool mounting portion 32 intersects the central axis F—F of recessed portions 54 so that it is possible to mount a tool exactly on the axis of the tool bar 14 as shown in FIGS. 1 and 2.

Various settings of the tool clamp on the gang tube may be made by positioning or adjusting the clamp relative to the gang tube. First, the clamp may be positioned on top or underneath the gang tube. The clamp can be positioned horizontally with the tool clamping portion 32 positioned either to the right or the left of the gang tube. The clamp can also be arranged vertically on either side of the gang tube so that the tool mounting portion 32 is on top or at the bottom and at right angles to the direction of travel to adjustably accommodate a crosshead for transverse spacing of the cultivator tools. The clamp can also be mounted at the end of the gang tube to position a ground working tool directly behind the gang tube or the clamp can be turned vertically so that a crosshead can be used.

In the normal operation of row crop cultivators, the ground working tools are mounted in longitudinal alignment, adjacent to and/or laterally offset from the round tubular gang bar. This enables the ground working tools to be laterally, longitudinally, vertically and angularly positioned relative to the gang tube and to each other to accommodate any crop row spacing or ground condition. The present invention provides a clamp structure by which all of the above positioning and adjustment of cultivating tools can be readily accomplished. The invention has the desirable attributes of standardized parts, flexibility of use, compactness, and low cost due to increased unit volume.

While a specific embodiment of this invention has been shown and described, it should be obvious that certain changes can be made and the invention should therefore be limited only by the appended claims.

I claim:

1. A tool clamp for connecting a tool standard to a tool bar comprising a clamping block provided with a first recess portion complementary to said tool bar, said clamp block being provided with apertures equally spaced in two directions for receiving a pair of U-bolts in surrounding relation to said tool bar for clamping said block to said tool bar with said tool bar positioned in said first recess, said block being provided with an end portion, an end cap coacting with said end portion for clamping a tool standard therebetween and at right angles to said tool standard, and said clamp block is provided with a second recess portion complementary to said tool bar and at right angles to said first recess portion for providing a second clamping surface for attaching said block to said tool bar.

2. A tool clamp as recited in claim 1 and wherein said second recess portion terminates in said end portion.

3. A tool clamp as recited in claim 2 and wherein said clamp block end portion is configured for receiving a round tool standard or a square tool standard.

4. A tool clamp as recited in claim 3 and wherein said end cap is configured complementary to said clamp block end portion.

References Cited

UNITED STATES PATENTS

| | | | |
|---|---|---|---|
| 749,226 | 1/1904 | Ripperger | 306—1.5 |
| 1,410,084 | 3/1922 | Viar | 172—743 |
| 1,475,744 | 11/1923 | Brown | 287—54 |
| 2,306,999 | 12/1942 | Dibner | 287—14 |

CARL W. TOMLIN, *Primary Examiner.*

W. L. SHEDD, J. L. KOHNEN, *Assistant Examiners.*